Feb. 28, 1939.  F. M. SMITH  2,148,781
VEHICLE FRONT END ASSEMBLY
Filed Oct. 14, 1937  2 Sheets-Sheet 1
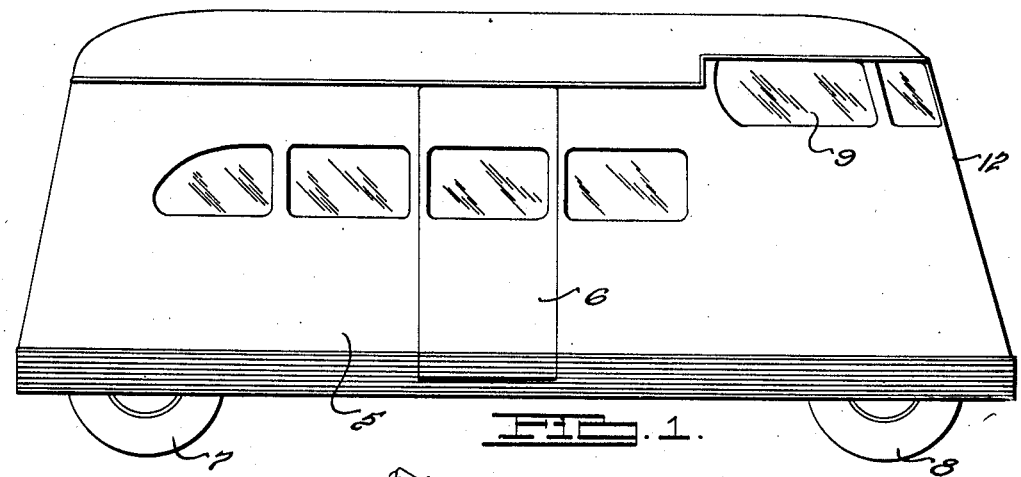
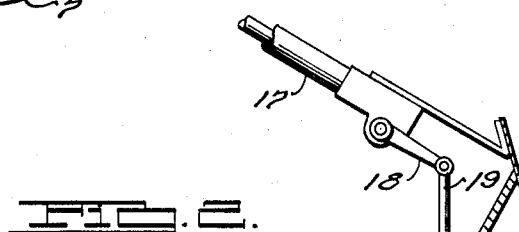
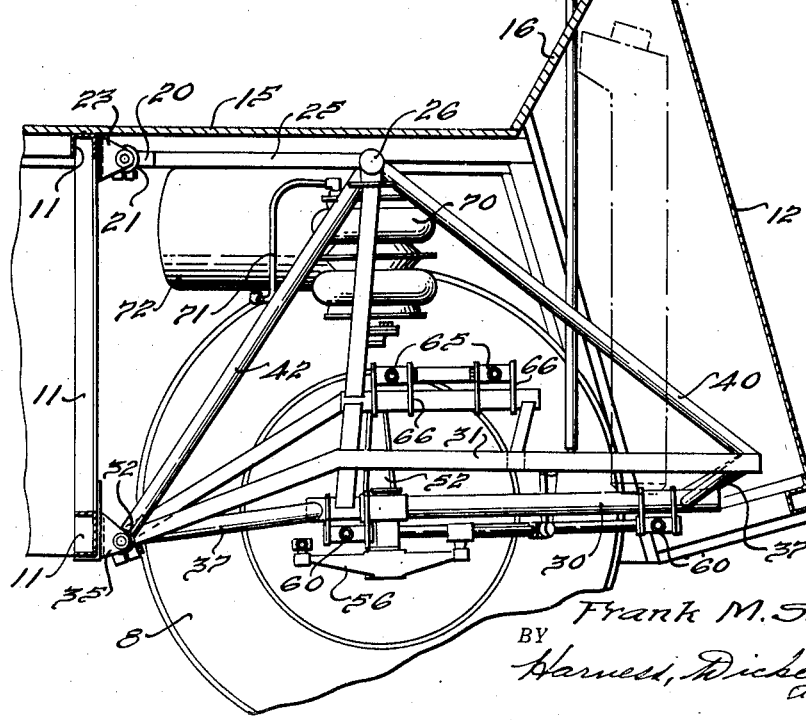
INVENTOR
Frank M. Smith.
BY
Harness, Dickey & Pierce
ATTORNEYS.

Feb. 28, 1939. F. M. SMITH 2,148,781
VEHICLE FRONT END ASSEMBLY
Filed Oct. 14, 1937 2 Sheets-Sheet 2

INVENTOR
Frank M. Smith.
BY Harness, Dickey & Pierce.
ATTORNEYS.

Patented Feb. 28, 1939

2,148,781

UNITED STATES PATENT OFFICE 2,148,781

VEHICLE FRONT END ASSEMBLY

Frank M. Smith, Dearborn, Mich., assignor, by mesne assignments, to Stout Engineering Laboratories, Inc., Dearborn, Mich., a corporation of Michigan Application October 14, 1937, Serial No. 169,002

4 Claims. (Cl. 280—106.5)

This invention relates generally to automotive vehicles. More particularly it relates to a front end assembly primarily adapted for use in connection with automotive vehicles in which the cab or driver's compartment thereof is located in a position substantially directly above the front wheels of the vehicle.

While the present embodiment of the invention illustrates the improved front end construction as applied to a motor vehicle having a rear engine drive, it will readily be appreciated that numerous of the inventive features described in detail below will have broad and practical utility in many and various other types of vehicles.

It is a primary object of the present invention to provide a strong, rigid, unitary front end assembly which includes means for mounting the front wheels of the vehicle, which assembly is easily demountable from the remainder of the body of the vehicle.

The invention contemplates the provision of a vehicle body construction in which the conventional chassis frame is entirely dispensed with and the body is formed of a rigid truss-like framework which not only includes the body frame of the vehicle but includes the chassis of the vehicle as well.

It will be readily appreciated that it is extremely desirable in vehicle body constructions of the type in which the cab is located over the front wheels, that the front end assembly be removable as a unit from the vehicle body construction because of the fact that in its assembled position the parts thereof are relatively inaccessible.

Still further, the invention contemplates the provision of novel and exceedingly simple means for connecting the front end assembly to the main body portion of the vehicle which connection includes resilient members which serve to aid in the elimination of the transmission of shocks from the front wheels to the body framework.

The invention further contemplates the provision of a novel and improved type of demountable connection for the front end assembly which not only serves to eliminate the shocks above mentioned but provides a simple and strong means of interconnecting these members which means at the same time is easily demountable in order that the front assembly as a unit may be disconnected from the main body portion of the vehicle.

Still further, the present invention contemplates the provision of a novel wheel suspension embodied in the demountable front end construction which wheel suspension is extremely simple in construction and at the same time very strong and rugged.

Many other and further objects, advantages, and features of the present invention will become clearly apparent from the following specification when considered in connection with the accompanying drawings forming a part thereof.

In the drawings:

Figure 1 is a side elevational view of a vehicle body construction embodying the improvements of the present invention and illustrating generally one type of automotive vehicle in which the improvements of the present invention may conveniently be embodied.

Figure 2 is a fragmentary vertical sectional view with parts in elevation illustrating in detail the improved demountable front end construction and the manner in which the same is mounted in and secured to the main body frame of the vehicle.

Figures 3, 4:
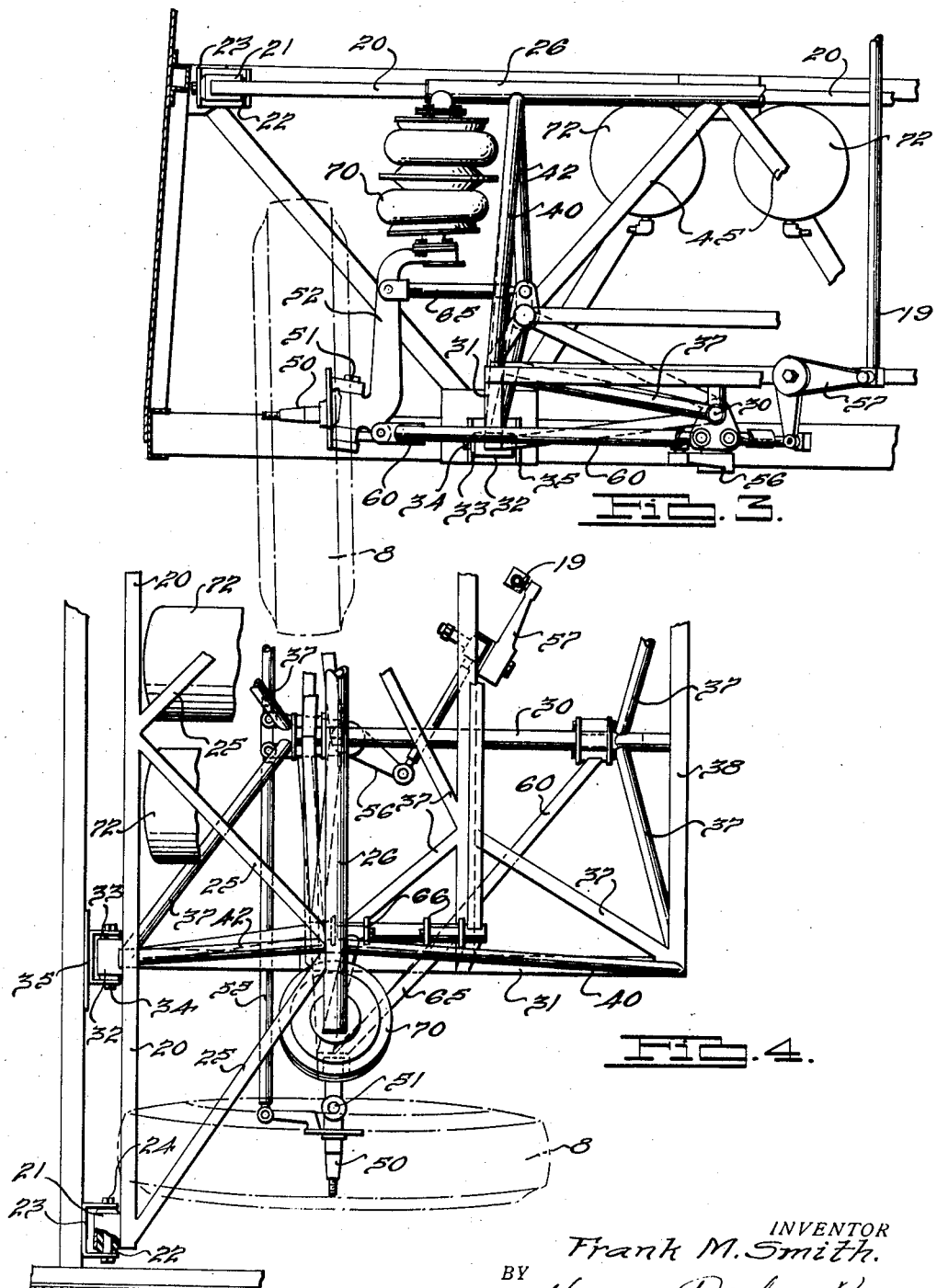
Figure 3 is a fragmentary front elevational view with parts broken away and parts in section illustrating in detail a portion of the improved front end construction showing the same mounted in position with respect to the vehicle body with which it is associated.
Figure 4 is a fragmentary top plan view with parts in section of the improved front end construction illustrating the same mounted in position with respect to the body of an automotive vehicle with which it is associated.

With more particular reference to the drawings, it will be readily understood that the particular automotive vehicle illustrated in Figure 1 is merely illustrative of one particular type of automotive vehicle which lends itself readily to the employment of the improved front end assembly forming the basis of the present application. The particular automotive vehicle shown includes a body generally designated as 5 which is provided with a main passenger carrying compartment in the longitudinally central portion thereof, access to which may be had through a door 6.

The vehicle includes a pair of rear wheels 7 which may be driven by means of a suitable rear engine drive (not shown) and a pair of front wheels 8 which form a part of the improved front end construction hereinafter described in detail.

In addition to the passenger carrying compartment of the vehicle, the body includes a driver's compartment 9, access to which may be conveniently had from the interior of the vehicle and which, as is clearly seen in Figures 1 and 2 of the drawings, is located substantially directly over the front wheels 8 of the vehicle. It will be readily understood that the location of this driver's compartment directly over the front wheels of the vehicle makes possible a substantial increase in interior available, usable space without at the same time necessitating an increase either in the wheel base or the over-all length of the vehicle body construction as a whole.

The main frame of the vehicle body is not illustrated in detail as the same forms no part of the present invention except in so far as it is combined with the novel front end assembly. It has been found preferable to construct a frame for vehicles of this type of channel-shaped or tubular members 11 welded together to provide a strong, rigid, truss-like framework for the vehicle body which framework at the same time forms the chassis of the vehicle.

The exterior surface of the vehicle body is preferably covered by means of sheet metal panelling 12 in order to give a smoothly finished, attractive, exterior appearance. This panelling may extend downwardly to a point slightly below the axis of the wheels of the vehicle in order to materially decrease wind resistance and provide an attractive ornamental exterior appearance. It will be noted by reference to the drawings, particularly Figure 2 thereof, that the frame of the body together with the panelling forms a housing at the front end of the vehicle directly beneath the driver's compartment 9 thereof.

The driver's compartment or cab of the vehicle includes a floor 15 and footboard 16 which separate the driver's compartment from the housing in which the improved front end construction of the vehicle is mounted. A conventional steering column 17 may be rigidly mounted within the driver's compartment and may include a conventional actuating arm 18 which at its outer end is pivotally connected to the operating rod 19 which extends directly downwardly through the footboard 16 and connects with the improved front end assembly in the manner described in detail below.

The improved front end assembly includes a main rear transversely extending member 20 which extends throughout substantially the entire transverse width of the vehicle and which has adjacent its ends bushings 21 which serve to house and enclose rubber annuli 22. Suitable U-shaped brackets 23 may have their bases welded directly to the main body frame and are adapted to receive bolts 24 which pass through the rubber annuli 22 to provide a firm yet slightly resilient interconnection between the frame member 20 and the main body of the vehicle.

Suitable brace members 25 extend obliquely forwardly from the transversely extending frame member 20 and these brace members 25 have their forward ends anchored to a transversely extending support member 26 which may be of tubular construction and which, as will be clearly seen in Figures 3 and 4 of the drawings, projects outwardly from the point of connection with the brace members 25 to provide extending portions at each end thereof. The main transversely extending frame member 20, the brace members 25, and the support member 26 serve to provide a rigid, truss-like framework which, for the purposes of simplicity, may be defined as the upper frame of the front end assembly. The front end assembly also includes a lower frame composed of a longitudinally extending central member 30 and side members 31.

These side members 31 may have suitable bushings 32 mounted at their rear ends which bushings may contain rubber annuli 33 which serve to surround and grip a transversely extending bolt 34 carried by a suitable bracket 35 anchored to the main frame of the vehicle body in substantially the same vertical plane as the brackets 23 described above.

This lower frame of the vehicle is reinforced by means of suitable diagonally extending brace members 37 which provide a strong, rigid, truss-like lower framework and the forward ends of the frame members 30 and 31 may be connected together by means of a brace member 38.

The upper and lower truss-like frames of the front end construction may be interconnected by means of suitable forwardly and downwardly extending braces 40 which have their upper and rearward ends connected to the support member 26 and their lower and forward ends connected to the members 31 and 38 at the junction thereof. Similarly, the upper frame and lower frame may be interconnected by downwardly and rearwardly extending brace members 42 which interconnect the support member 26 with the bushings 32 which, as explained above, are anchored to the rear ends of the longitudinally extending frame members 31. This front assembly as a whole may be further braced by means of downwardly extending brace members 45 which slope downwardly and outwardly from substantially the central portion of the support member 26 and have their lower ends anchored to the lower frame of the structure.

All of the frame members and brace members described above may conveniently be formed of steel tubular members all welded together to provide an extremely strong and rigid truss-like framework. The framework is adapted to provide a mounting for the front wheels 8 of the vehicle which, as is conventional in constructions of this general character, may conveniently be mounted on suitable stub axles 50 each mounted for steering movement about a king pin 51 carried by a knuckle bracket 52.

The steering of the wheels is effected by means of suitable tie rods 55 which are connected with the actuating rod 19 by suitable bell cranks 56 and 57 in order to supply the steering movements from the steering column 17 to the wheels 8. The knuckle arms 52 have pivotally connected to their lower ends the outer ends of arms 60, the inner ends of which are pivotally connected in suitable brackets to the central lower frame member 30 and it will be seen that these arms together constitute a lower wishbone of the individual wheel suspension. Adjacent the upper ends, the knuckle arms have wishbones 65 pivotally connected thereto, the inner ends of which are pivotally connected with suitable brackets 66 to the framework thereby permitting relative vertical movement of the knuckle arm with respect to the framework and consequent individual movement of the front wheels. The knuckle arms have the portion thereof which extends above the upper wishbone 65 bent laterally inwardly toward the central portion of the vehicle to provide means for connecting thereto the power end of a pneumatic bellows 70, the upper end of which is connected to the outer end of the support arm 26. These pneumatic bellows provide the necessary resiliency for the wheel suspension and, in order to increase the resiliency thereof, these pneumatic bellows may be connected by means of suitable conduits 71 to individual tanks or reservoirs 72 in order to increase the fluid volume and consequent resiliency of the suspension.

From the foregoing it will be appreciated that the improved front end assembly not only provides a strong, rigid framework which is easily and conveniently demountably secured to the body framework of the vehicle and which thus constitutes a portion of the chassis thereof, but also provides a novel and convenient independent wheel suspension for each of the front wheels of the vehicle. It will be noted that the connection between the front wheel assembly as a whole and the vehicle body construction has a slight resiliency inherently provided by the rubber annuli serving to interconnect these members thus precluding the possibility of shocks being transmitted from the front assembly to the vehicle body proper.

It will be readily apparent that the front end assembly, shown in the drawings and described above, is not only rigid in itself but simple in construction and provides an especially satisfactory suspension for the front wheels of the vehicle and permits the mounting of the entire unit in a relatively restricted space immediately beneath the driver's compartment of the vehicle.

While but one embodiment of the present invention has been illustrated and described, it will be readily appreciated that the same is merely illustrative of the generic inventive concepts presented in the present application. Many other and further modifications thereof falling within the scope of the invention as defined in the subjoined claims will become clearly apparent to those skilled in the art.

I claim:

1. In an automotive vehicle having a main body frame and a front wheel assembly demountably secured thereto, said front wheel assembly including a truss-like framework, a pair of steering ground wheels suspended for independent relative vertical movement with respect thereto, said framework including a transversely extending member extending substantially the entire transverse width of the body, means adjacent the ends of said transversely extending member for anchoring said framework to the body frame and means substantially below said transversely extending member for further anchoring said framework to said body frame.

2. In an automotive vehicle having a main body frame and a front end assembly adapted for demountable securement thereto, said front end assembly comprising a truss-like framework, a pair of steering ground wheels suspended for relative vertical movement with respect thereto, said framework including a transversely extending member extending substantially the entire transverse width of the body, resilient means adjacent the ends of said member for demountably anchoring said framework to said body frame, said framework further including a pair of longitudinally extending members, and resilient means on the rear ends of said members for further anchoring said framework to said body frame.

3. A front end assembly adapted to constitute the forward portion of the chassis frame of an automotive vehicle, comprising a truss-like framework, means on said framework for mounting a pair of steering ground wheels, said framework including in the upper rear portion thereof a transversely extending frame member having its ends projecting beyond the outboard sides of said wheels, means adjacent the ends of said member for demountably securing the same to the body frame of a vehicle body, said framework further including a pair of longitudinally extending members in the lower portion thereof having means at their rearward ends for demountably securing said framework to said vehicle body frame.

4. A front end assembly adapted to constitute the forward portion of the chassis frame of an automotive vehicle, comprising a truss-like framework, means on said framework for mounting a pair of steering ground wheels, said framework including in the upper rear portion thereof a transversely extending frame member having its ends projecting beyond the outboard sides of said wheels, resilient bushings carried on said frame member adjacent the ends thereof serving to provide means for demountably securing said framework to the frame of a vehicle body, said framework further including in the lower portion thereof a pair of longitudinally extending frame members having resilient bushings at their rear ends providing further means for demountably securing said framework to said body frame.

FRANK M. SMITH.